April 1, 1958 — W. J. SEME — 2,828,580
CHILD'S TRAY
Filed July 6, 1953 — 2 Sheets-Sheet 1

INVENTOR.
WILLIS J. SEME
BY
ATTY.

April 1, 1958

W. J. SEME 2,828,580

CHILD'S TRAY

Filed July 6, 1953

INVENTOR.
WILLIS J. SEME
BY
ATTY.

United States Patent Office 2,828,580
Patented Apr. 1, 1958

2,828,580

CHILD'S TRAY

Willis J. Seme, Cleveland, Ohio

Application July 6, 1953, Serial No. 366,189

2 Claims. (Cl. 46—116)

This invention relates in general to improvements in trays for removably receiving such food containing receptacles as glasses, cups, bowls and the like, in such a manner as to avoid tipping of the same or spillage of their contents as long as they remain in the improved tray.

Such devices which have become conventional accomplish just that purpose, and nothing more. As long as the glass, or the like, remains in a special retaining device in the tray, it will not be inadvertently tipped, nor will the contents of the glass be spilled. There still remains no special incentive for the child to pick up the glass, aside from hunger, or thirst, both of which are many times an inadequate incentive, especially in point of time as far as impatient parents are concerned. There remains even less incentive for the child to return the glass to its retaining device on the tray after the contents have been wholly, or partially, consumed, so as to avoid tipping of the glass or spillage of its contents on the table.

It is therefore one of the primary objects of my invention to provide the food receptacle depository device in the tray with means that will be activated upon removal from, as well as upon its redeposit in, the tray.

With the foregoing and other objects in view, the invention resides in the combination of parts and in the details of construction set forth in the following specification and appended claims, certain embodiments thereof being illustrated in the accompanying drawings, in which:

Figure 1:
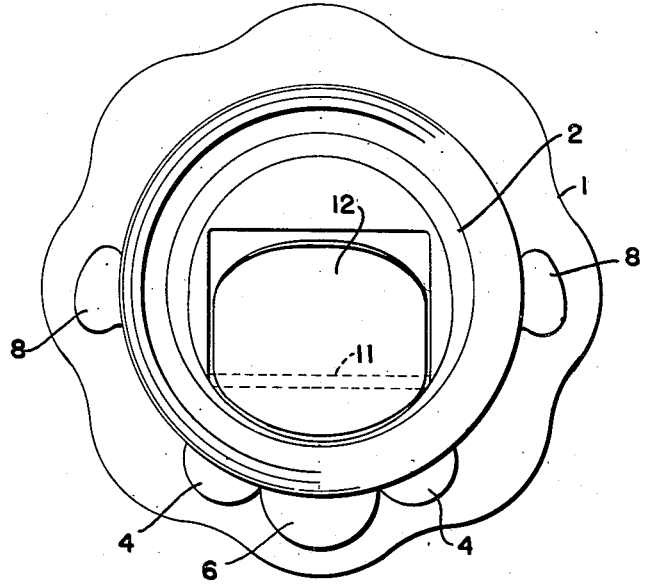
Figure 1 is a top plan view of the food receptable retaining tray, with the receptacle removed, this illustration being one form which the invention may take.
Figure 2:
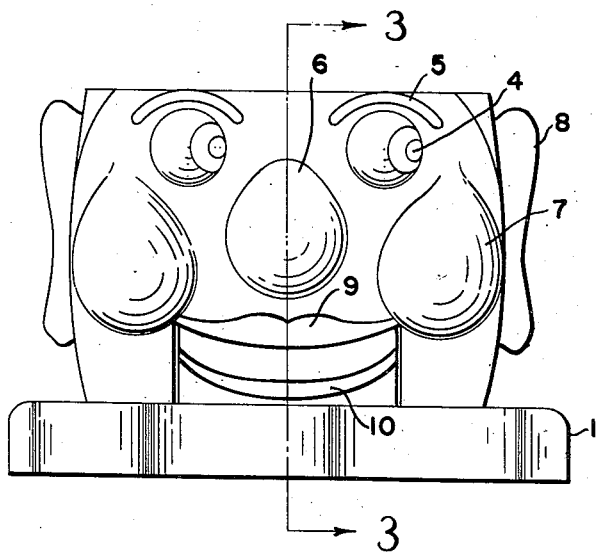
Figure 2 is a view in front elevation of that shown in Figure 1, the same simulating the face of a clown, in which the lower lip, being movable up and down, into closed and open mouth positions, is shown in lower, and mouth open, position while the food receptacle is removed from the retaining tray.
Figure 4:
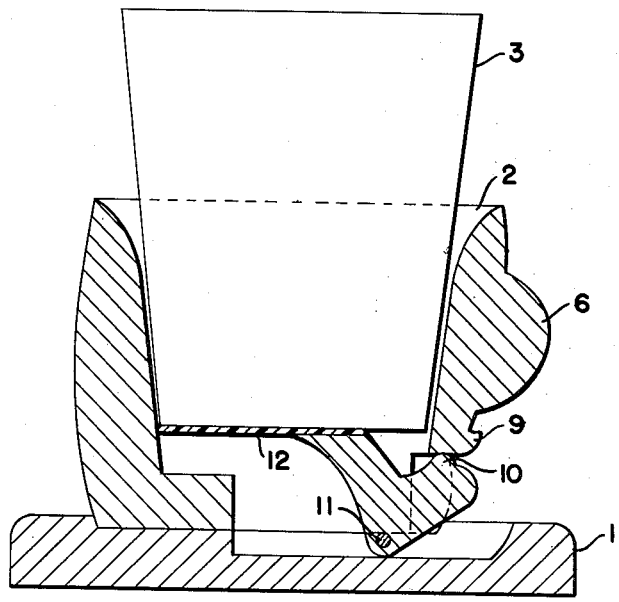
Figure 3:
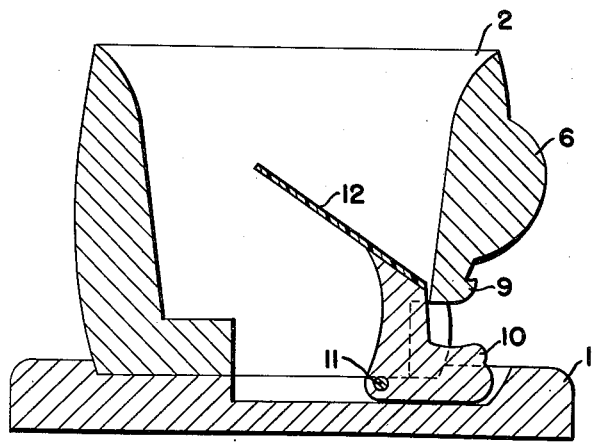

Figure 3 is a view in vertical section taken along line 3—3 of Figure 2, showing the counterbalanced pivoted lower lip and the platform unoccupied by the food receptacle and the lower lip in its lower open mouth position; and Figure 4 is a sectional view similar to Figure 3, showing the food receptacle resting on the platform in the retainer to move the lower lip about its pivot to the upper mouth closing position.

Referring more particularly to the drawings, I have shown a stable retainer to include a wide base 1 and a tapered upper opening 2 to receive a food, or drink, receptacle, such as a glass 3.

In keeping with providing an incentive to enhance the child's interest in partaking of food at meal time, I show, in Figure 2, the front of the body of the retainer to be in the form of a clown's face, with eyes 4, eyebrows 5, nose 6, cheeks 7, ears 8, stationary upper lip 9 and movable lower lip 10.

As shown in Figure 3, the lower lip 10 is pivotally connected at 11 to the retainer body and mechanically counterbalanced to normally assume a lower, open mouth, position and vertically spaced from the stationary upper lip 9. Rigid with the upper inner portion of the lower lip 10 is a platform 12. In Figure 4 the glass 3 has been deposited in the retainer to rest on the platform 12. The weight of the glass, with or without contents, has caused the lower lip 10 to rotate counterclockwise from its position of Figure 3 to that of Figure 4.

Now, assume the child to be seated at the table and the glass to contain milk, or the like. Its attention will be drawn to the clown's face. As the parent picks up the glass, the child will notice the lower lip drop. When the child has drunk some of the milk, the parent replaces the glass in the retainer and the child notices the lower lip move upwardly to close the clown's mouth. In short time, the child goes through this routine by himself. The incentive is there for it to pick up the glass from the retainer so as to activate a change in expression on the clown's face and this is in addition to the child's thirst for a drink of milk. The child, having temporarily quenched his thirst, would under ordinary circumstances, set the glass down on the table and, most likely, tip the glass and spill the contents on the table. Were an ordinary non-activated glass holder tray employed, there would be no incentive for the child to return the glass to the tray. However, in the present device, the child knows that the clown will change his facial expression when the child replaces the glass in the holder and the child does so for its own entertainment.

In disclosing the spirit of my invention, I have shown one simple form which it may take, that of a movable lower lip of a clown's face. It is, however, to be understood that it may take many other forms. Even in the use of a face, I may provide means for activating other facial features, accompanied, or unaccompanied by lighting or sound effects. The point is to provide a lure, or incentive, for the child to both withdraw and replace the food receptacle and to provide automatic weight responsive means in the tray, and not the glass, that furnishes the child with amusement, or interest, during both operations.

I claim:

1. A child's training device comprising a tray having a base, a body and an upper opening in said body sufficiently large to releasably receive a food, or liquid, receptacle, which is manually retractable through said opening a platform pivotally secured to said body to be pivotally movable therein and positioned to support said receptacle when manually deposited in said body through its upper opening, said pivoted platform being of such dimensions, with respect to said body opening, as to preclude the falling of said receptacle off of the platform downwardly past the platform into the lower part of said body, said body having on its external surface an image of a face, at least one feature of which is connected to said platform so as to be responsive both to the weight of said receptacle when manually placed on the platform and also to the manual removal of said receptacle from said platform through said upper body opening for producing different movements of said facial feature.

2. A child's training device comprising a tray having a base, a body and an upper opening in said body sufficiently large to releasably receive a food, or liquid, receptacle, which is manually retractable through said opening a platform pivotally secured to said body to be pivotally movable therein and positioned to support said receptacle when manually deposited in said body through its upper opening, said pivoted platform being of such dimensions, with respect to said body opening, as to preclude the falling of said receptacle off of the platform downwardly past the platform into the lower part of said body, said body having on its external surface an image of a face, including an upper and lower lip of a mouth, one of said lips being connected to said platform so as to be responsive both to the weight of said receptacle when manually placed on the platform and also to the manual removal of said receptacle from said platform through said upper body opening for producing movements of said lip toward and away from the other lip into closed and open mouth positions respectively.

References Cited in the file of this patent

UNITED STATES PATENTS

| | | |
|---|---|---|
| 189,907 | Smith | Apr. 24, 1877 |
| 255,090 | Shepherd et al. | Mar. 14, 1882 |
| 579,630 | Zimmerman et al. | Mar. 30, 1897 |
| 628,519 | Burke et al. | July 11, 1899 |
| 1,429,506 | Herr | Sept. 19, 1922 |
| 1,521,532 | Hansen | Dec. 30, 1924 |
| 2,416,959 | Segal | Mar. 4, 1947 |
| 2,504,541 | Lawson, Jr. | Apr. 18, 1950 |
| 2,535,704 | Snyder et al. | Dec. 26, 1950 |
| 2,650,452 | Martin | Sept. 1, 1953 |